(12) United States Patent
Sasaki

(10) Patent No.: US 7,623,704 B2
(45) Date of Patent: Nov. 24, 2009

(54) COLOR PROCESSING METHOD, COLOR PROCESSING APPARATUS, AND STORAGE MEDIUM

(75) Inventor: Makoto Sasaki, Kanagawa (JP)

(73) Assignee: Fuji Xerox Co. Ltd., Tokyo (JP)

( * ) Notice: Subject to any disclaimer, the term of this patent is extended or adjusted under 35 U.S.C. 154(b) by 1129 days.

(21) Appl. No.: 10/660,572

(22) Filed: Sep. 12, 2003

(65) Prior Publication Data

US 2004/0151370 A1  Aug. 5, 2004

(30) Foreign Application Priority Data

Jan. 31, 2003  (JP) .............................. 2003-023565

(51) Int. Cl.
G06K 9/00 (2006.01)
G03F 3/10 (2006.01)

(52) U.S. Cl. .................. 382/162; 358/518; 358/1.9; 358/2.1; 358/3.1; 345/589; 345/591; 345/592; 382/163; 382/164; 382/165; 382/167; 382/254; 382/141; 382/260

(58) Field of Classification Search .............. 358/1.9, 358/518, 519, 461, 2.1, 512, 515, 3.1, 500, 358/529, 530, 520; 382/254, 162, 176, 164, 382/166, 167, 173, 180, 206, 266, 243, 251, 382/141, 260, 165; 345/589, 591, 592, 593, 345/597, 600, 604, 605, 549, 72, 83, 88
See application file for complete search history.

(56) References Cited

U.S. PATENT DOCUMENTS 6,108,441 A * 8/2000 Hiratsuka et al. ........... 382/167

| 6,575,096 B1 * | 6/2003 | Caruthers et al. ........... 101/491 |
| 6,608,942 B1 * | 8/2003 | Le .............................. 382/279 |
| 6,917,704 B2 * | 7/2005 | Kojima et al. ............... 382/166 |
| 2002/0044691 A1 * | 4/2002 | Matsugu ..................... 382/218 |
| 2002/0090133 A1 * | 7/2002 | Kim et al. ................... 382/164 |

FOREIGN PATENT DOCUMENTS

| EP | 1 087 614 A2 | 3/2001 |
| EP | 1 089 552 A2 | 4/2001 |
| JP | A-05-276527 | 10/1993 |
| JP | A 6-78320 | 3/1994 |
| JP | A 7-46416 | 2/1995 |
| JP | A 2001-169135 | 6/2001 |
| JP | A-2001-255864 | 9/2001 |
| JP | A-2001-326826 | 11/2001 |
| JP | B2 3264273 | 12/2001 |

* cited by examiner

*Primary Examiner*—King Y Poon
*Assistant Examiner*—Steven Kau
(74) *Attorney, Agent, or Firm*—Oliff & Berridge, PLC

(57) ABSTRACT

A representative color calculation section calculates a representative color representing a region, which is a subject of color adjustment in an input image. A color adjustment distance calculation section calculates, as a color adjustment distance, a Euclidean distance on a color space between the representative color calculated by the representative color calculation section and a given target color. A reproduction color calculation section calculates a reproduction color expressing the adjusted color of the region, which is the subject of the color adjustment, in such a manner that the colors of the region is adjusted on the basis of the color adjustment distance so that the colors of the region is adjusted little when the color adjustment distance is long, but the color of the region is brought near to the target color when the color adjustment distance is short.

20 Claims, 9 Drawing Sheets

- ○ : REPRESENTATIVE COLOR
- ⊘ : TARGET COLOR
- ● : REPRODUCTION COLOR

COLOR PROCESSING METHOD, COLOR PROCESSING APPARATUS, AND STORAGE MEDIUM

The present disclosure relates to the subject matter contained in Japanese Patent Application No.2003-23565 filed on Jan. 31, 2003, which is incorporated herein by reference in its entirety.

BACKGROUND OF THE INVENTION

1. Field of the Invention

The present invention relates to a technique for adjusting the color of a specific region in a color image optimally. Particularly, the invention relates to a technique for deciding a reproduction color after adjustment in a natural image containing a memory color such as flesh color, sky blue, or grass green, which are remembered as an impression of the image by people, on the basis of the memory color, which is a subject of the adjustment, and reproducing the reproduction color on a region of the memory color in the natural image.

2. Description of the Related Art

When a natural image having a region of a memory color remembered by people needs to be adjusted automatically, there is generally taken a method in which a target color for the memory color, which is a subject of the adjustment, is provided so that the region of the memory color in the natural image is adjusted toward the target color. For example, in a memory color adjusting method described in JP-A-2001-169135 (corresponding to EP1089552), a histogram of pixels having pixel values, which are in a predetermined range of hue, is generated on the basis of an input image. An average value in the memory color region in the image is calculated on the basis of the histogram. Look-up tables, which are generated for every color component so that the difference between the average value and an optimum value set, which is prepared in advance, can be eliminated, are used to perform color adjustment.

On the other hand, Japanese Patent No.3264273 (corresponding to EP1087614) has disclosed a technique in which after a representative color of a memory color region, which is a subject of adjustment, is extracted from an image, a correction value prepared in advance in accordance with each hue is used to perform the adjustment. In this case, a color, which has been already decided on the basis of the correction value stored in a memory in advance, is used as the target color.

The correction value of the region, which is the subject of the color adjustment, in the image varies widely according to the degree of brightness or saturation in the subject region. For this reason, if the related-art method is used, it is difficult to keep balance between the correction value at strong correction and the correction value at weak correction. Even in the case where the correction value is set according to each color region in advance, labor is required for setting the correction value.

In the related-art technique, there is the possibility that the adjusted image may be unnatural compared with the original image before the adjustment though the color can come near to an ideal memory color. In the case where the color is adjusted so as to be widely different from a memory color in the original image, the adjusted image becomes unnatural compared with the original image. When, for example, the color of a sky near a cloudy sky is reproduced as the color of a clear sky, it cannot be said that the reproduction is preferable so long as a special request is not given. The same rule can also apply to a case of flesh color or grass green. When the adjusted image is widely different from the original image, it can be hardly said that the reproduction is preferable. However, if the quantity of color adjustment is weakened in consideration of such circumstances, there is a problem that correction becomes weak, for example, in a case of a general blue sky so that preferable reproduction cannot be carried out well.

SUMMARY OF THE INVENTION

The invention is developed to solve the problem. An object of the invention is to provide a color processing method and a color processing apparatus for deciding a target color, which is not unnatural with respect to the color of an original image, and being capable of extracting desirableness sufficiently when the color of a specific region such as a memory color is adjusted, and a color processing method and a color processing apparatus for adjusting the color of a specific region by using the decided target color. Another object of the invention is to provide a color processing program for executing the color processing method and a storage medium storing the color processing program.

An embodiment of the invention provides a color processing method and a color processing apparatus for adjusting colors of a specific region, which is a subject of the adjustment in a color image. The color processing method and the color processing apparatus calculates a color adjustment distance, which is a distance on a color space between a representative color representing the specific region in the color image and a target color, which is target of the adjustment, on the basis of the representative color and the target color, and decides a reproduction color expressing the representative color of the specific region after the adjustment on the basis of the color adjustment distance, wherein the reproduction color is located between the representative color and the target color. By calculating the reproduction color on the basis of the color adjustment distance in this manner, unnaturalness due to adjustment to the target color can be eliminated when the representative color is widely different from the target color, and preferable reproduction due to good color adjustment can be made when the representative color and the target color are near to each other.

Particularly for calculation of the reproduction color, in the color processing method and the color processing apparatus, a reproduction distance coefficient, which is used to calculate the reproduction color, may be calculated on the basis of the color adjustment distance. The reproduction color may be calculated on the basis of the color adjustment distance and the reproduction distance coefficient. Further, in the color processing method and the color processing apparatus, a brightness adjustment coefficient, which is used to adjust brightness of the reproduction color, may be calculated on the basis of the representative color. The reproduction color may be calculated on the basis of the color adjustment distance, the reproduction distance coefficient, and the brightness adjustment coefficient. In this case, the brightness adjustment coefficient may be calculated on the basis of at least one of brightness, saturation and hue of the representative color. In any case, the reproduction distance coefficient may be calculated, for example, in accordance with one of a monotone decreasing function of the color adjustment distance and a differentiable and continuous function of the color adjustment distance. Alternatively, the reproduction distance coefficient may be calculated in accordance with a function of the color adjustment distance which takes a constant when the color adjustment distance is not larger than a predetermined value, but is a differentiable and continuous function when the color adjustment distance is larger than the predetermined value.

The target color corresponding to the representative color maybe, for example, one of a given color, a color selected from a plurality of colors, and a color having a predetermined color component ratio. The target color may be a color having the same color component ratio as that of the representative color. The target color may be set according to the representative color.

Further, in the invention, the colors of the specific region may be adjusted toward the reproduction color calculated in the aforementioned manner. Because the reproduction color is set as a reproduction color between the representative color and the target color on the basis of the color adjustment distance as described above, the color can be adjusted as a preferable color for the specific region by the color adjustment toward the reproduction color.

The embodiment of the invention further provides a color processing program to make a computer execute the color processing, and a storage medium storing the program.

DETAILED DESCRIPTION OF THE PREFERRED EMBODIMENTS

Figure 1:
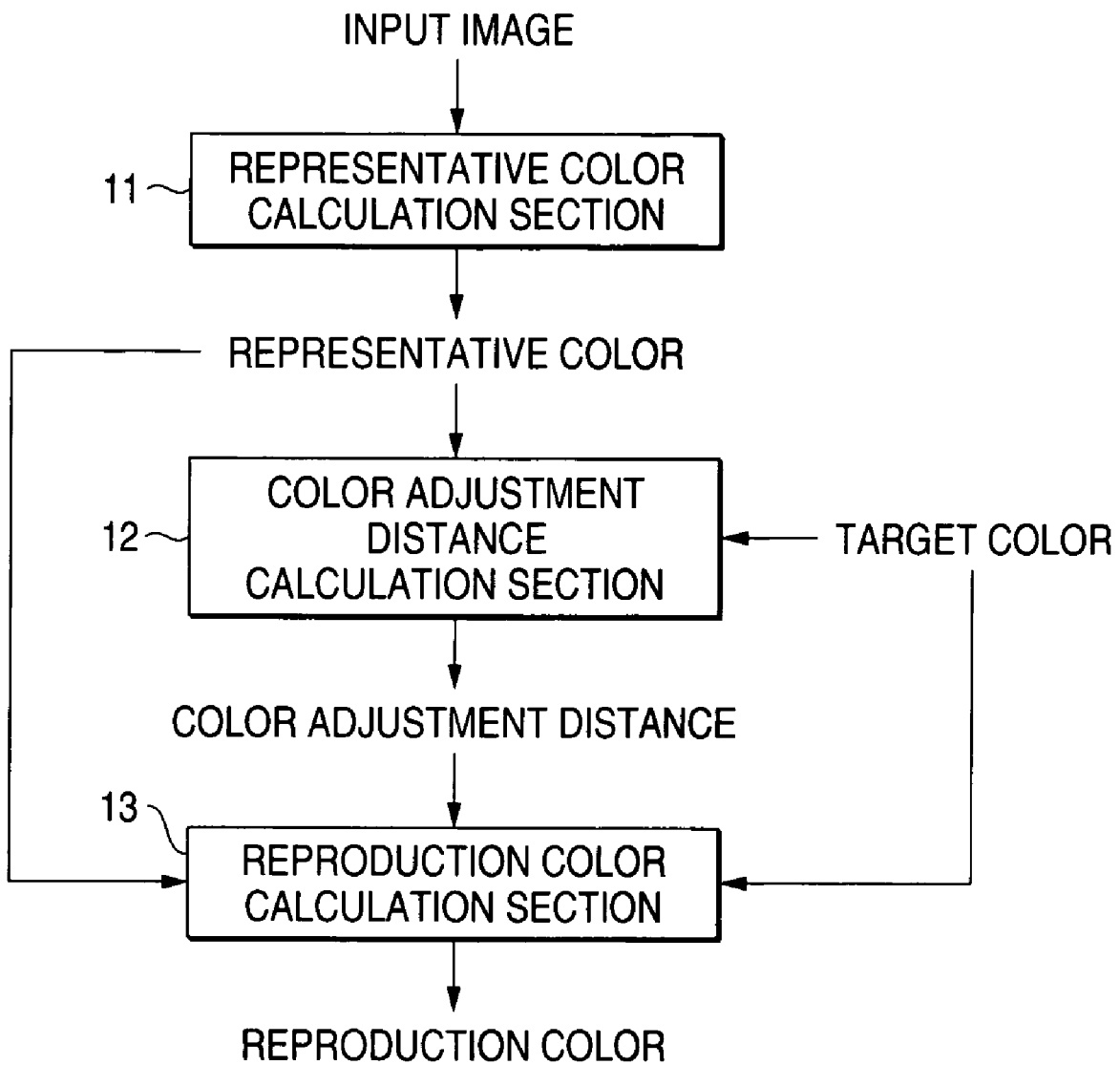
FIG. 1 is a block diagram showing a first embodiment of the invention.

FIG. 1 is a block diagram showing a first embodiment of the invention. In FIG. 1, the reference numeral 11 designates a representative color calculation section; 12, a color adjustment distance calculation section; and 13, are production color calculation section. The representative color calculation section 11 calculates a color representing a region, which is a subject of color adjustment, from an input image and regards the color as a representative color. The calculation of the representative color can be made by a known technique concerning image region recognition. Various methods may be used. For example, a color range is determined on the basis of hue or the like in advance so that the representative color is calculated on the basis of an average of pixel values in the color range.

The color adjustment distance calculation section 12 calculates an Euclidean distance on a color space between the representative color calculated by the representative color calculation section 11 and a given target color, and regards the Euclidean distance as a color adjustment distance. Here, the target color is a target color in the region, which is the subject of the color adjustment. The target color may be prepared in advance or the target color may be selected from a plurality of colors prepared. Alternatively, the ratio of color components of the target color in the region, which is the subject of the adjustment, may be prepared as $R:G:B=k_R:k_G:k_B$ in advance and then, the target color may be obtained by transforming the representative color so that the target color has the ratio of RGB components, which is equal to the aforementioned ratio. When, for example, the region, which is the subject of the adjustment, is a region of the sky, the target color can be calculated by ratio transformation given by the expression:

$$(R_t, G_t, B_t)=((k_R/k_B)B_0, (k_G/k_B)B_0, B_0) \tag{1}$$

in which $(R_0, G_0, B_0)$ are the coordinates of the representative color on the RGB color space, and $(R_t, G_t, B_t)$ are the coordinates of the target color on the RGB color space. That is, the target color can be calculated so that the B component of the target color expressing characteristic of the sky color best is fixed to the B component of the representative color, that is, the RG components of the target color are generated on the basis of the B component of the representative color. Incidentally, as the color adjustment distance, which is a distance between the representative color and the target color, there may be used any distance such as an Euclidean distance or a distance weighted with color sensitivity, etc.

The reproduction color calculation section 13 calculates a reproduction color expressing the adjusted color of the region, which is the subject of the adjustment. The target color calculated by the expression (1) is only used for indicating the direction of color adjustment. The reproduction color calculated by the reproduction color calculation section 13 is used for actual color adjustment. As described above, even in the case where the target color is set, the finished image may be unnatural compared with the original image so that, for example, a scene of a cloudy sky is converted into a scene of a clear sky when adjustment is made in such manner that the representative color is entirely replaced with the target color. The same rule applies to flesh color or grass green. Accordingly, preferable reproduction cannot be obtained when the adjustment is made in such a manner that the finished image is widely different from the original image. When the representative color is moderately distant from the target color, it is however preferable to bring the representative color close to the target color sufficiently. As described above, there is the possibility that nonconformity may occur when the representative color is made entirely coincident with the target color. Therefore, a reproduction color is provided between the representative color and the target color, and the representative color is brought close to the reproduction color to thereby achieve preferable reproduction. On this occasion, the reproduction color can be decided on the basis of the magnitude of the color adjustment distance. Here, the relation between the color adjustment distance and the reproduction color to make the aforementioned reproduction possible may be prepared in advance or any method maybe used so long as such reproduction color can be calculated.

Figure 2:
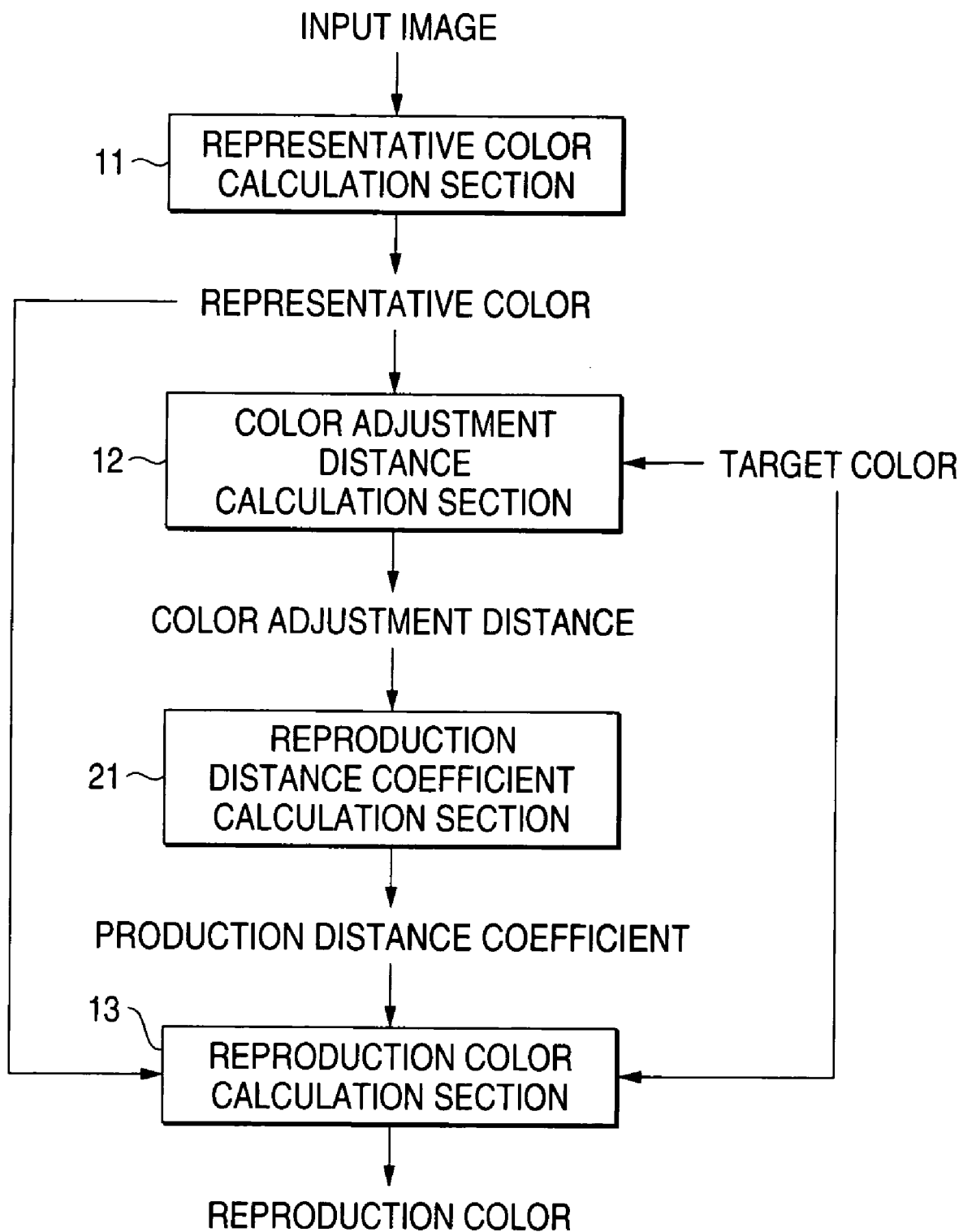
FIG. 2 is a block diagram showing a second embodiment of the invention.

FIG. 2 is a block diagram showing a second embodiment of the invention. In FIG. 2, sections, which are same as those in FIG. 1, are denoted by the same reference numerals as those in FIG. 1. The reference numeral 21 designates a reproduction distance coefficient calculation section. Incidentally, the representative color calculation section 11 and the color adjustment distance calculation section 12 are the same as those in the first embodiment, and the description thereof will be omitted here.

The reproduction distance coefficient calculation section 21 calculates a reproduction distance coefficient as a multiplier by which the color adjustment distance is multiplied to calculate the reproduction color so that the color of the subject region after the adjustment can be reproduced naturally and preferably compared with the color thereof before the adjustment.

Figure 3A:
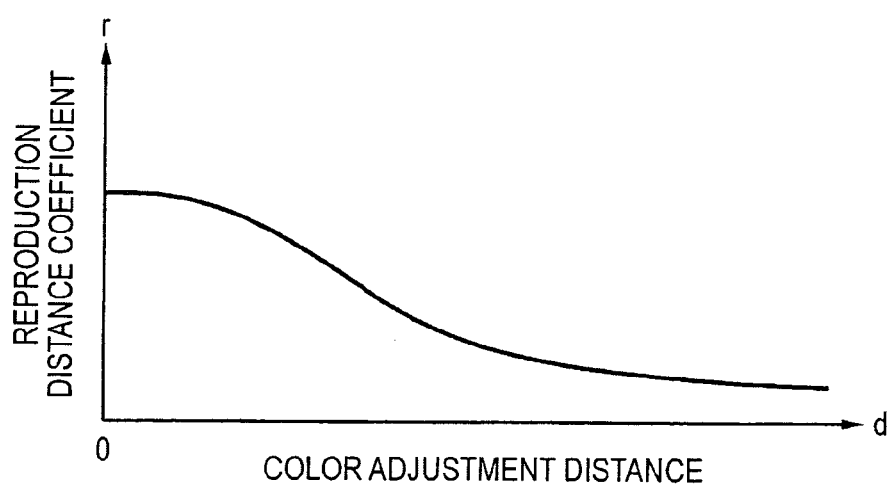
FIGS. 3A and 3B are graphs showing an example of the relation between color adjustment distance and reproduction distance coefficient/reproduction distance.
Figure 3B:
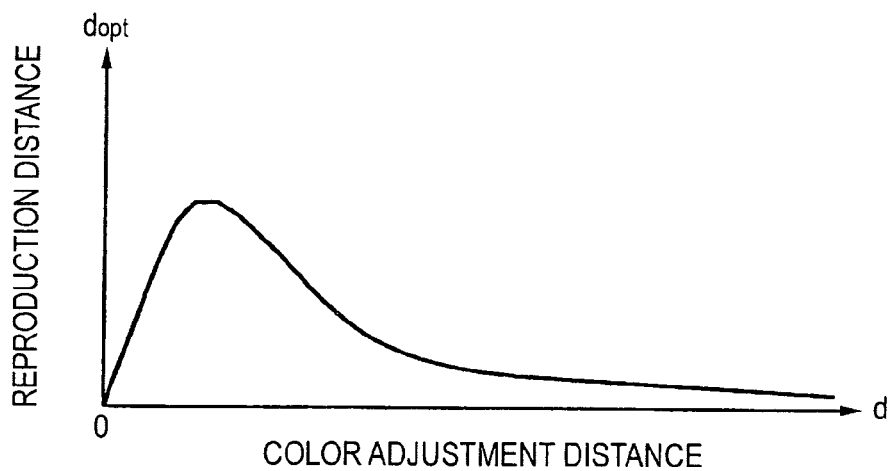

FIGS. 3A and 3B are graphs showing an example of the relation between the color adjustment distance and the reproduction distance coefficient/the reproduction distance. A function of color adjustment distance d and reproduction distance coefficient r as shown in FIG. 3A can be given, for example, by the expression:

$$r = 1/(1+(d/d_{inf})^P) \quad (2)$$

in which $d_{inf}$ is a parameter expressing an inflection point of the function, and p is a parameter expressing a slope of the function.

When the reproduction distance coefficient r defined by a monotonically decreasing function as expressed by the expression (2) is used, a reproduction distance $d_{opt}$, which is a distance from the representative color to the reproduction color, can be given as follows.

$$d_{opt} = r \cdot d \quad (3)$$

The reproduction distance $d_{opt}$ calculated thus can be written as follows.

$$d_{opt} = r \cdot d = d/(1+(d/d_{inf})^P) \quad (4)$$

FIG. 3B is a graph showing the relation between the color adjustment distance d and the reproduction distance $d_{opt}$ as given by the expression (4). The outline of the graph shown in FIG. 3B can be drawn easily on the basis of an extreme value calculated by differentiating the expression (4) once.

FIGS. 4A to 4E are views for explaining a scheme for deciding the reproduction color. As is obvious from FIG. 3B, there production color is calculated so that the color adjustment is little made when the representative color is widely distant from the target color, whereas the reproduction color is calculated so that preferable maximum color adjustment is made when the representative color is moderately distant from the target color. It is a matter of course that the distance from the representative color to the reproduction color is zero when the representative color coincides with the target color. In FIGS. 4A to 4E, such a relation is explained on the basis of the positional relation between the representative color and the target color.

Figure 4:
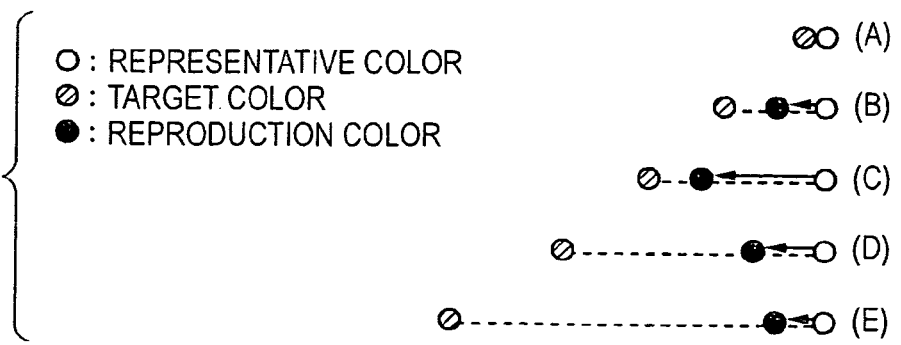
FIGS. 4A to 4E are views for explaining a scheme for deciding the reproduction color.

FIG. 4A shows a case where the representative color approximately coincides with the target color. In this case, the reproduction distance is approximately zero. Though not shown, the reproduction color is a color approximately coincident with the representative color and with the target color. Accordingly, substantially preferable color reproduction can be made regardless of adjustment of the representative color to the target or reproduction color.

FIG. 4B or 4C shows cases where the representative color is moderately distant from the target color. In these cases, the reproduction distance is set at a value near the distance between the representative color and the target color, and the reproduction color is set at a color near the target color. Then, the color adjustment maybe made so that the representative color is brought just or close to the reproduction color. As a result, preferable color reproduction can be made.

FIG. 4D or 4E shows cases where the representative color is widely distant from the target color. In these cases, there is the possibility that unnatural color reproduction will be made if the representative color is adjusted to the target color or a color near the target color in the aforementioned manner. To prevent such nonconformity, a small value is calculated as the reproduction distance, and the reproduction color is set at a color near the representative color. As a result, the color adjustment is made toward the target color but the quantity of the adjustment is so small that unnatural color reproduction can be prevented from being caused by the color widely distant from the original color.

Although the aforementioned example shows the case where the relation between the reproduction distance coefficient and the color adjustment distance is given by a continuous function, the invention is not limited to this example. For example, the relation between the color adjustment distance and the reproduction distance coefficient maybe prepared as a look-up table so that the color adjustment distance and the reproduction distance coefficient are associated with each other in advance. That is, any method may be used so long as the correlation between the color adjustment distance and the reproduction distance coefficient can be provided so as to be equal to the relation given by the function.

Figure 5A:
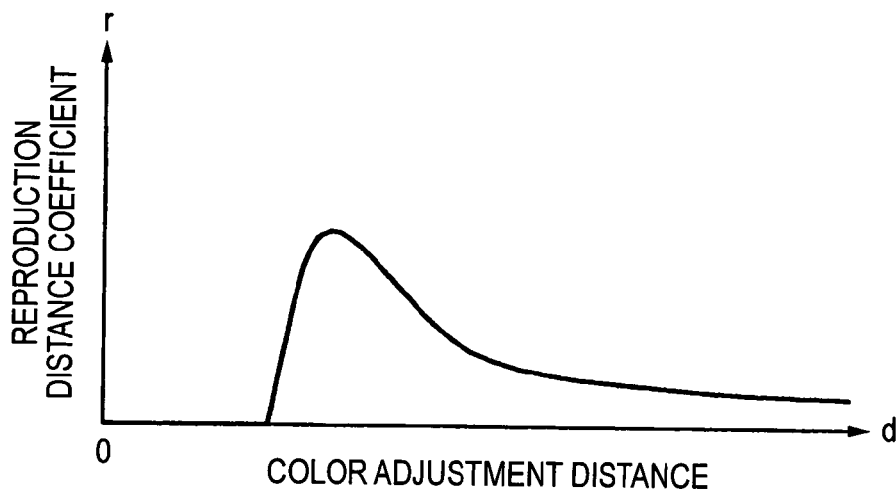
FIGS. 5A to 5C are graphs showing other examples of the relation between color adjustment distance and reproduction distance coefficient/reproduction distance.
Figure 5B:
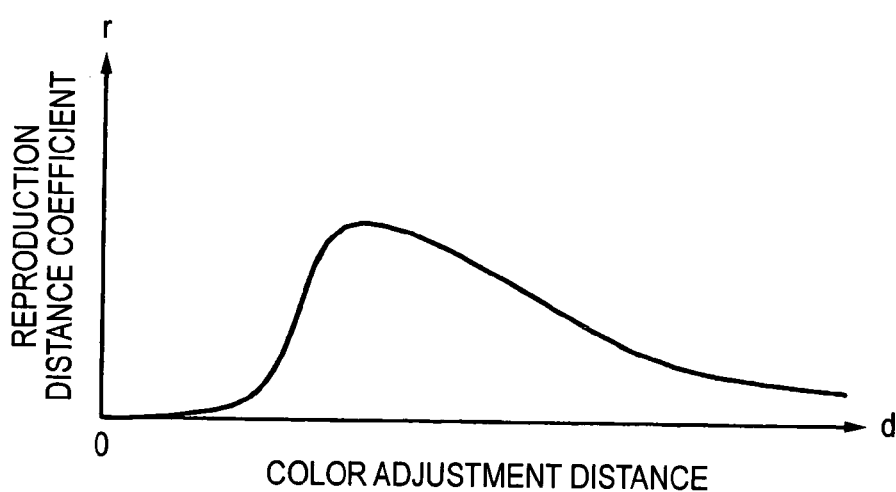
Figure 5C:
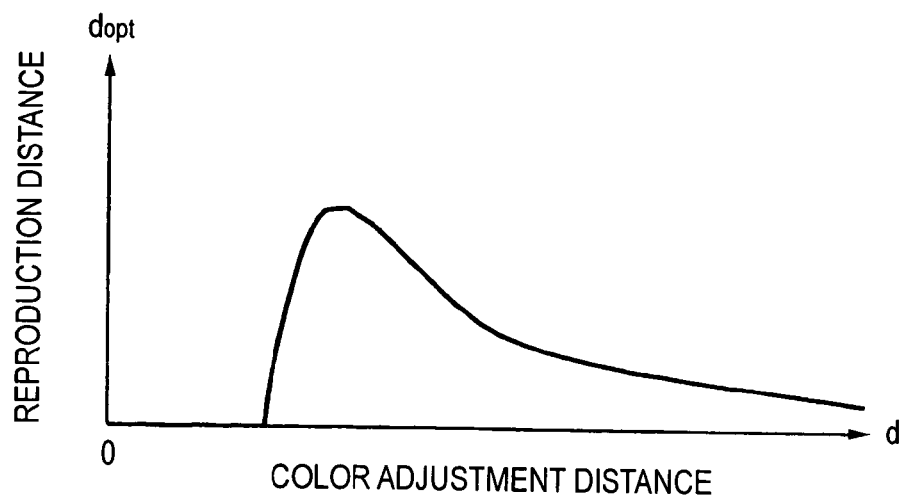

Although FIG. 3A shows an example of the relation between the color adjustment distance and the reproduction distance coefficient, the invention is not limited to this example and maybe configured so that the reproduction distance coefficient is calculated on the basis of various relations. FIGS. 5A to 5C are graphs showing other examples of the relation between the color adjustment distance and the reproduction distance coefficient/the reproduction distance. For example, FIG. 5A shows a case where the reproduction distance coefficient is set at zero when the color adjustment distance is in a predetermined range. FIG. 5B shows a case where the same relation as in FIG. 5A is given by a continuous function.

For example, the relation between the color adjustment distance and the reproduction distance as shown in FIG. 5C can be calculated on the basis of the relation between the color adjustment distance and the reproduction distance coefficient as shown in FIG. 5A. As is obvious from the graph shown in FIG. 5C, in the case where there production distance coefficient is decided on the basis of the relation shown in FIG. 5A, the relation between the color adjustment distance and the reproduction distance is provided so that the reproduction distance is set at zero when the color adjustment distance is in a certain range, increases little by little when the color adjustment distance exceeds the certain range, and decreases little by little with increase in the color adjustment distance when the color adjustment distance is larger than a certain value.

Figure 6:
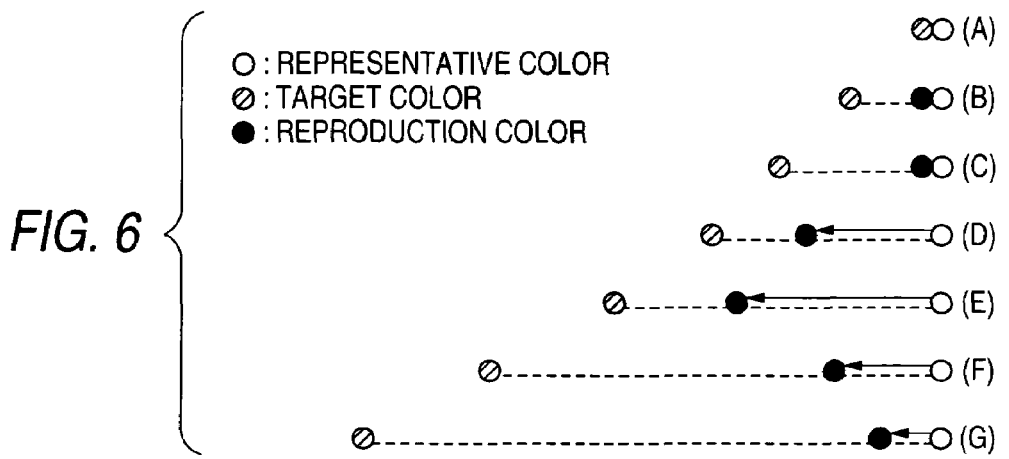
FIGS. 6A to 6G are views for explaining another scheme for deciding the reproduction color.

FIGS. 6A to 6G are views for explaining another scheme for deciding the reproduction color. That is, FIGS. 6A to 6G show a scheme for deciding the reproduction color on the basis of the relation between the color adjustment distance and the reproduction distance coefficient/the reproduction distance as shown in FIGS. 5A and 5C. Each of FIGS. 6A to 6C shows a case where the color adjustment distance is in a certain range. In this case, the reproduction color is equal to the representative color itself because the reproduction distance is set at zero as described above. Accordingly, the representative color is output directly without adjustment. As a result, when the representative color and the target color are similar to each other, configuration may be made so that the color of the original image is reproduced as it is.

FIGS. 6D and 6E are similar to FIGS. 4B and 4C and show cases where the representative color is moderately distant from the target color. In these cases, the reproduction color is set at a color near the target color. As a result, the color adjustment is made so that the representative color is brought to be the reproduction color near the target color.

FIGS. 6F and 6G are similar to FIGS. 4D and 4E and show cases where the representative color is widely distant from the target color. In these case, a small value is calculated as the reproduction distance, and the reproduction color is set at a color near the representative color. Accordingly, the color adjustment is little made. As a result, unnatural color reproduction can be prevented from being caused by adjustment to a color widely distant from the color of the original image.

In this manner, when the representative color is very near to or very far from the target color, the color of the original image is given preference without unreasonable color adjustment to thereby make it possible to prevent unnatural color reproduction or reproduce the color preferentially.

Referring back to FIG. 2, the reproduction color calculation section 13 calculates the reproduction color using the representative color, the target color, and there production distance coefficient calculated by the reproduction distance coefficient calculation section 21 as described above. The reproduction color ($R_{opt}$, $G_{opt}$, $B_{opt}$) can be calculated on the basis of the representative color ($R_0$, $G_0$, $B_0$), the target color ($R_t$, $G_t$, $B_t$) and the reproduction distance coefficient r as follows.

$$R_{opt}=R_0+r(R_t-R_0)$$

$$G_{opt}=G_0+r(G_t-G_0)$$

$$B_{opt}=B_0+r(B_t-B_0) \quad (5)$$

Incidentally, because $r=(d_{opt}/d)$ is obtained from the relation shown in the expression (3), the reproduction distance $d_{opt}$ may be obtained on the basis of the reproduction distance coefficient r and then, the expression (5) maybe calculated by using ($d_{opt}/d$) (using the reproduction distance $d_{opt}$ and the color adjustment distance d) instead of the reproduction distance coefficient r.

Figure 7:
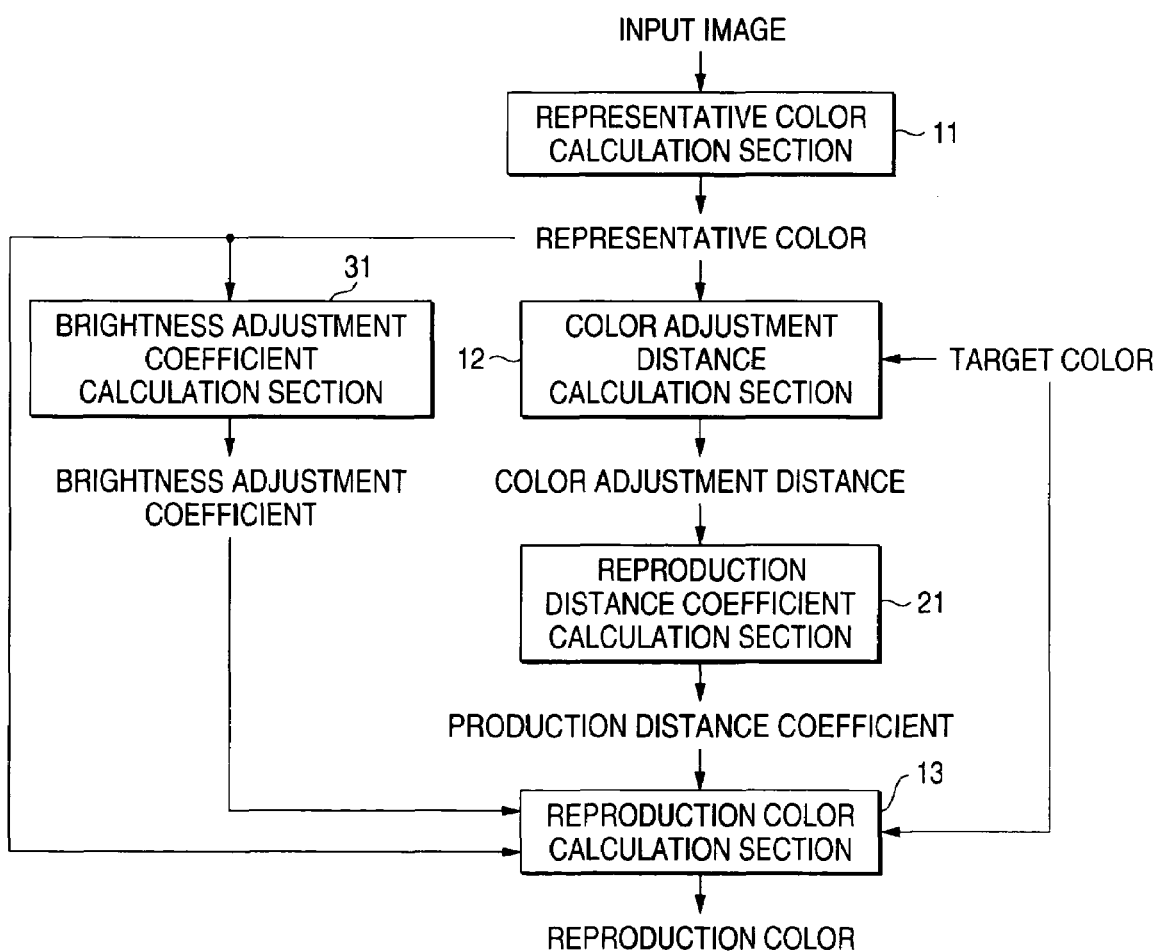
FIG. 7 is a block diagram showing a third embodiment of the invention.

FIG. 7 is a block diagram showing a third embodiment of the invention. In FIG. 7, sections, which are same as those in FIGS. 1 and 2, are denoted by the same reference numerals as those in FIGS. 1 and 2. The reference numeral 31 designates a brightness adjustment coefficient calculation section. Incidentally, the representative color calculation section 11, the color adjustment distance calculation section 12 and the reproduction distance coefficient calculation section 21 are the same as those in the second embodiment, and the description thereof will be omitted here. The third embodiment is formed in such a manner that a configuration for finely adjusting brightness of the reproduction color is added to the configuration of the second embodiment. Brightness has characteristic to which human eyes react most sensitively. For this reason, brightness of the reproduction color is a significant factor used for judgment as to whether preferable reproduction for the adjustment subject region is made or not. Particularly in a case where brightness of the subject region after the adjustment is widely different from brightness of the subject region of the original image, the adjusted image is apt to be regarded as a misadjusted image in comparison with a case where color saturation of the subject region after the adjustment is widely different from color saturation of the subject region of the origin image. It is therefore preferable that the reproduction color expressing the color after the adjustment is finely adjusted by using the representative color to make brightness natural compared with the brightness of the subject region of the original image. The third embodiment shows an example of such fine adjustment of brightness.

Figure 8:
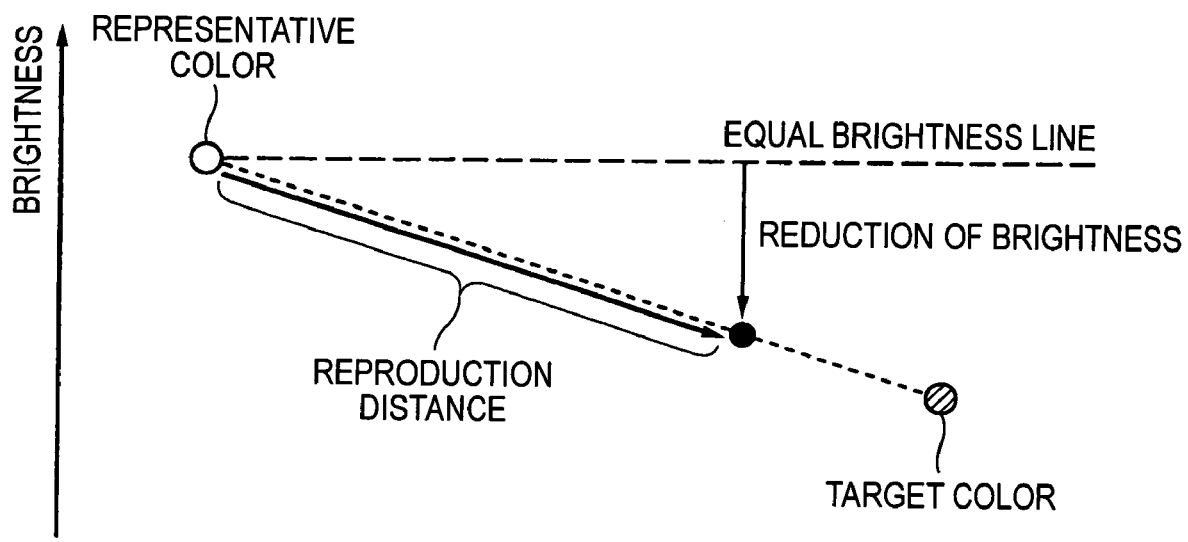
FIG. 8 is a view for explaining an example of the case where brightness is reduced.

In the brightness adjustment coefficient calculation section 31, a brightness adjustment coefficient, which is a coefficient for adjusting brightness of the reproduction color, is calculated in accordance with the representative color. When, for example, the target color is calculated by ratio transformation of color components of the representative color according to the expression (1), there is the possibility that brightness of the target color may be lower than that of the representative color. FIG. 8 is a view for explaining an example of a case where brightness is reduced. In the example shown in FIG. 8, brightness of the target color is lower than brightness of the representative color. In this case, it is obvious that brightness is reduced when the color adjustment is made in such a manner that the representative color is brought toward the target color by the reproduction distance as shown by an arrow in FIG. 8. The brightness adjustment coefficient calculation section 31 calculates a brightness adjustment coefficient used for relieving the reduction of the brightness to a certain degree in such color adjustment.

Figure 9:
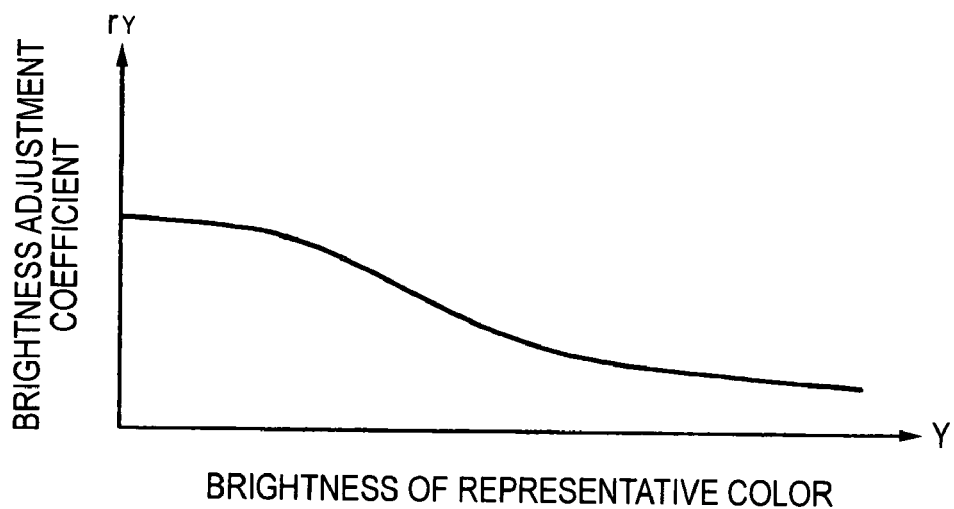
FIG. 9 is a graph showing an example of the relation between brightness of the representative color and brightness adjustment coefficient.

FIG. 9 is a graph showing an example of the relation between brightness of the representative color and the brightness adjustment coefficient. The brightness adjustment coefficient obtained from the graph of FIG. 9 indicates a relation that brightness of the representative color is not preserved as brightness of the representative color is higher but brightness of the representative color is preserved as brightness of the representative color is lower. Generally, in a region of high brightness, the color range is apt to be narrow. If brightness of the representative color is preserved in such a region of high brightness, there is the possibility that the reproduction color will be unable to be expressed because the reproduction color is out of the color range. It is therefore preferable that brightness of the representative color is slightly reduced when brightness of the representative color is high. The brightness adjustment coefficient is set in consideration of such characteristic.

The brightness adjustment coefficient calculated thus is delivered to the reproduction color calculation section 13. The reproduction color calculation section 13 calculates the reproduction color using the reproduction distance coefficient calculated by the reproduction distance coefficient calculation section 21 and the brightness adjustment coefficient calculated by the brightness adjustment coefficient calculation section 31 as well as the representative color and the target color. On this occasion, the use of the brightness adjustment coefficient permits the brightness of the reproduction color to be brought close to the brightness of the representative color when the brightness of the reproduction color calculated by use of the reproduction distance coefficient is lower than the brightness of the representative color as shown in FIG. 8. A method for adjusting the reproduction color by using the brightness adjustment coefficient will be described below. Incidentally, a color space such as YCbCr or L*a*b* is provided as a color space that can express brightness. This example will be described in a case where a YCbCr color space is used.

When the representative color $(R_0, G_0, B_0)$ is expressed as a point $(Y_0, Cb_0, Cr_0)$ on the YCbCr color space, and the reproduction color $(R_{opt}, G_{opt}, B_{opt})$ calculated on the basis of the reproduction distance coefficient, the representative color and the target color in the second embodiment is expressed as a point $(Y_{opt}, Cb_{opt}, Cr_{opt})$ on the YCbCr color space, a point $(Y'_{opt}, Cb'_{opt}, Cr'_{opt})$ after the adjustment of the brightness of $(Y_{opt}, Cb_{opt}, Cr_{opt})$ by the brightness adjustment coefficient $r_Y$ can be given as follows.

$$Y'_{opt} = Y_0 + r_Y(Y_{opt} - Y_0)$$

$$Cb'_{opt} = Cb_{opt}$$

$$Cr'_{opt} = Cr_{opt} \quad (6)$$

A point $(R'_{opt}, G'_{opt}, B'_{opt})$ on the RGB space obtained by reverse transformation of the thus calculated point $(Y'_{opt}, Cb'_{opt}, Cr'_{opt})$ from the YCbCr color space to the RGB space may be output as the reproduction color after the adjustment of the brightness.

Figure 10:
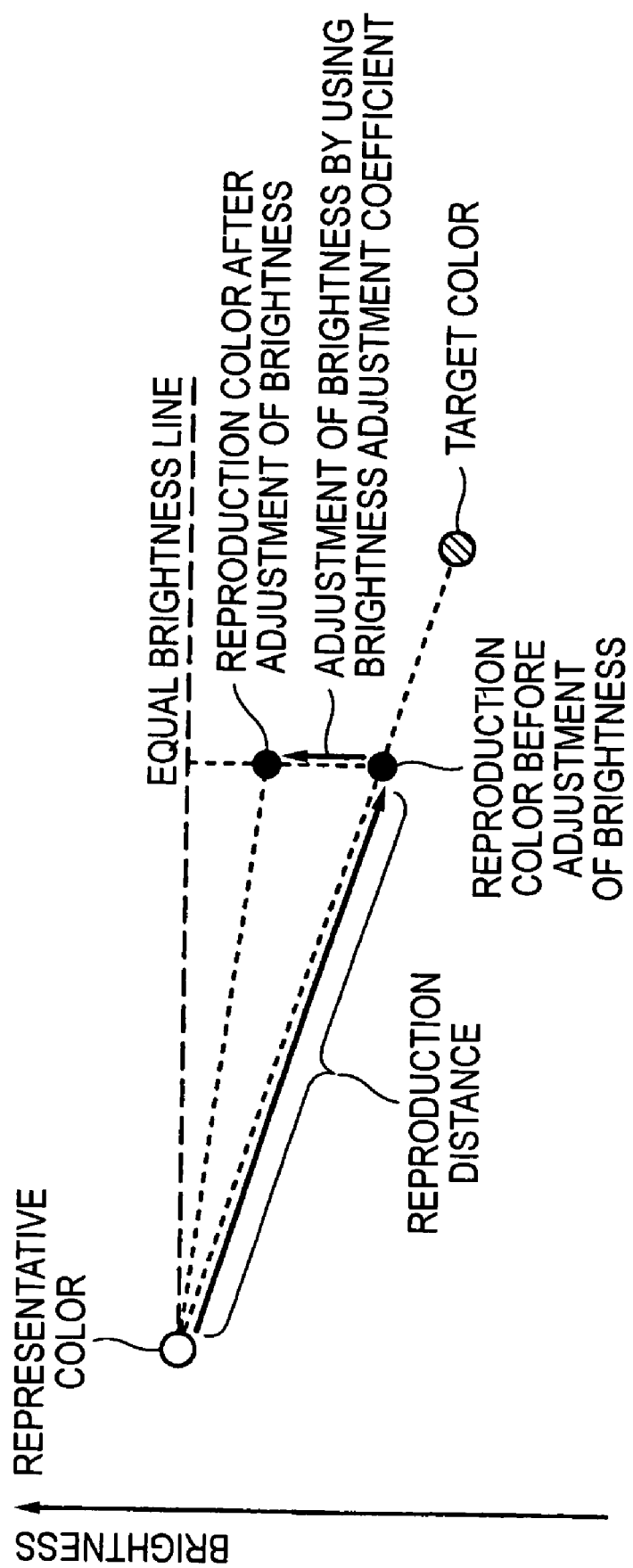
FIG. 10 is a view for explaining an example of the reproduction color output in the third embodiment of the invention.

FIG. 10 is a view for explaining an example of the reproduction color output in the third embodiment of the invention. As explained also in FIG. 8, when adjustment is made so that the representative color is brought toward the target color, which has lower brightness than the representative color, by the reproduction distance, the representative color is adjusted to a color designated by a point A in FIG. 10 (that is, to the reproduction color before the adjustment of brightness). This color A is a color output as the reproduction color in the second embodiment. In the third embodiment, the brightness adjustment-coefficient is further used for calculating the reproduction color after the adjustment of brightness in the aforementioned manner. The point B in FIG. 10 designates the reproduction color after the adjustment of brightness. The color B adjusted thus is output as the reproduction color. In this manner, according to the third embodiment, the color adjustment can be made so that the reduction in brightness is relieved to a certain degree.

Figure 11:
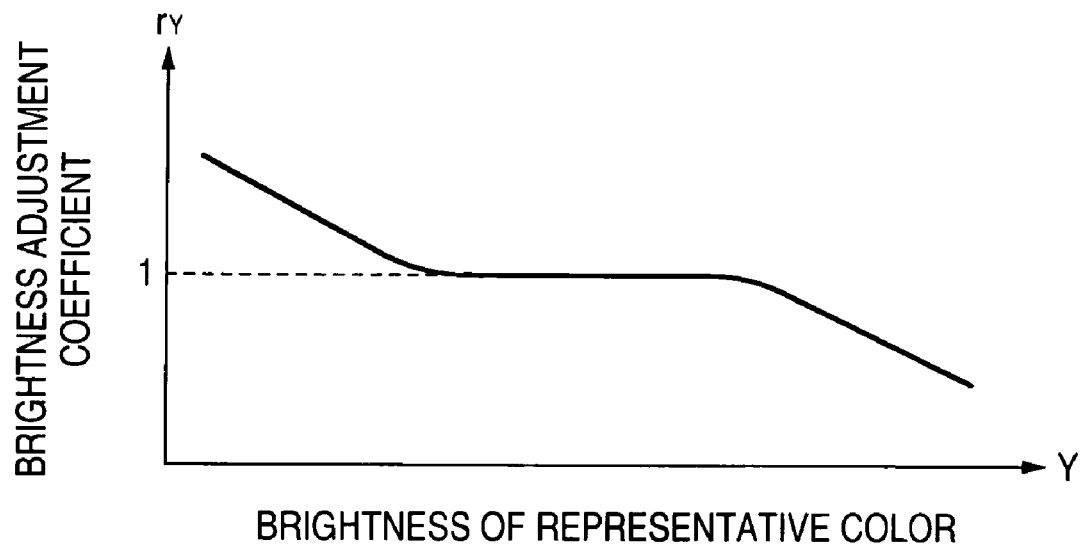
FIG. 11 is a graph showing another example of the relation between brightness of the representative color and brightness adjustment coefficient.

FIG. 11 is a graph showing another example of the relation between the brightness of the representative color and the brightness adjustment coefficient. The relation between the brightness of the representative color and the brightness adjustment coefficient for use in the third embodiment of the invention is not limited to the example shown in FIG. 9. For example, there may be used such a brightness adjustment coefficient that the finely adjusted brightness of the final reproduction color $(Y'_{opt}, Cb'_{opt}, Cr'_{opt})$ is directly associated with the brightness of the representative color as shown in FIG. 11. In the case where the brightness adjustment coefficient having the relation shown in FIG. 11 is used, brightness adjusted by the brightness adjustment coefficient can be calculated according to the following expression (7) when the representative color $(R_0, G_0, B_0)$ is expressed as a point $(Y_0, Cb_0, Cr_0)$ on the YCbCr color space.

$$Y'_{opt} = r_Y Y_0 \quad (7)$$

As described above, any coefficient may be used so long as the coefficient can be used for adjusting the brightness of the reproduction color on the basis of the brightness of the representative color. For example, the degree of change of the brightness adjustment coefficient shown in FIG. 9 or 11 may be changed according to color saturation or hue of the representative color.

Figure 12:
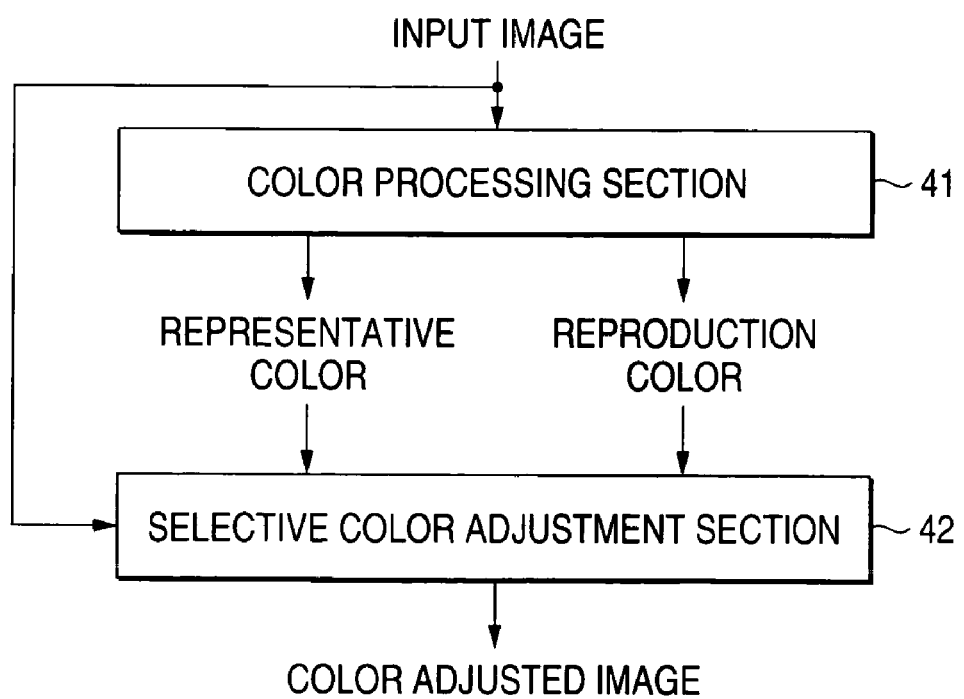
FIG. 12 is a block diagram showing a fourth embodiment of the invention.

FIG. 12 is a block diagram showing a fourth embodiment of the invention. In FIG. 12, the reference numeral 41 designates a color processing section; and 42, a selective color adjustment section. The fourth embodiment shows an example of a color processing system for carrying out the color adjustment using any one of the first to third embodiments of the invention.

The color processing section 41 includes the configuration described in any one of the first to third embodiments of the invention and outputs the representative color and the reproduction color. The selective color adjustment section 42 carries out color adjustment on a region, which is a subject of adjustment, in an input image so that the color adjustment is made from the representative color of the subject region toward the reproduction color. It is conceived that the subject region contains various colors near the representative color as well as the representative color. These colors can be also adjusted in accordance with the relation between the representative color and the reproduction color. Any method may be used for adjusting these colors. For example, the difference between the representative color and the reproduction color may be added to or subtracted from each of these colors or the ratio of the representative color to the reproduction color may be applied to each of these colors.

When adjustment is made thus, preferable adjustment can be applied to the representative color while over-adjustment can be avoided. Accordingly, colors in one subject region can be adjusted to optimal colors, respectively. Accordingly, an image adjusted to preferable colors can be obtained without adjustment made in such a manner that the image is widely different from the original image.

Figure 13:
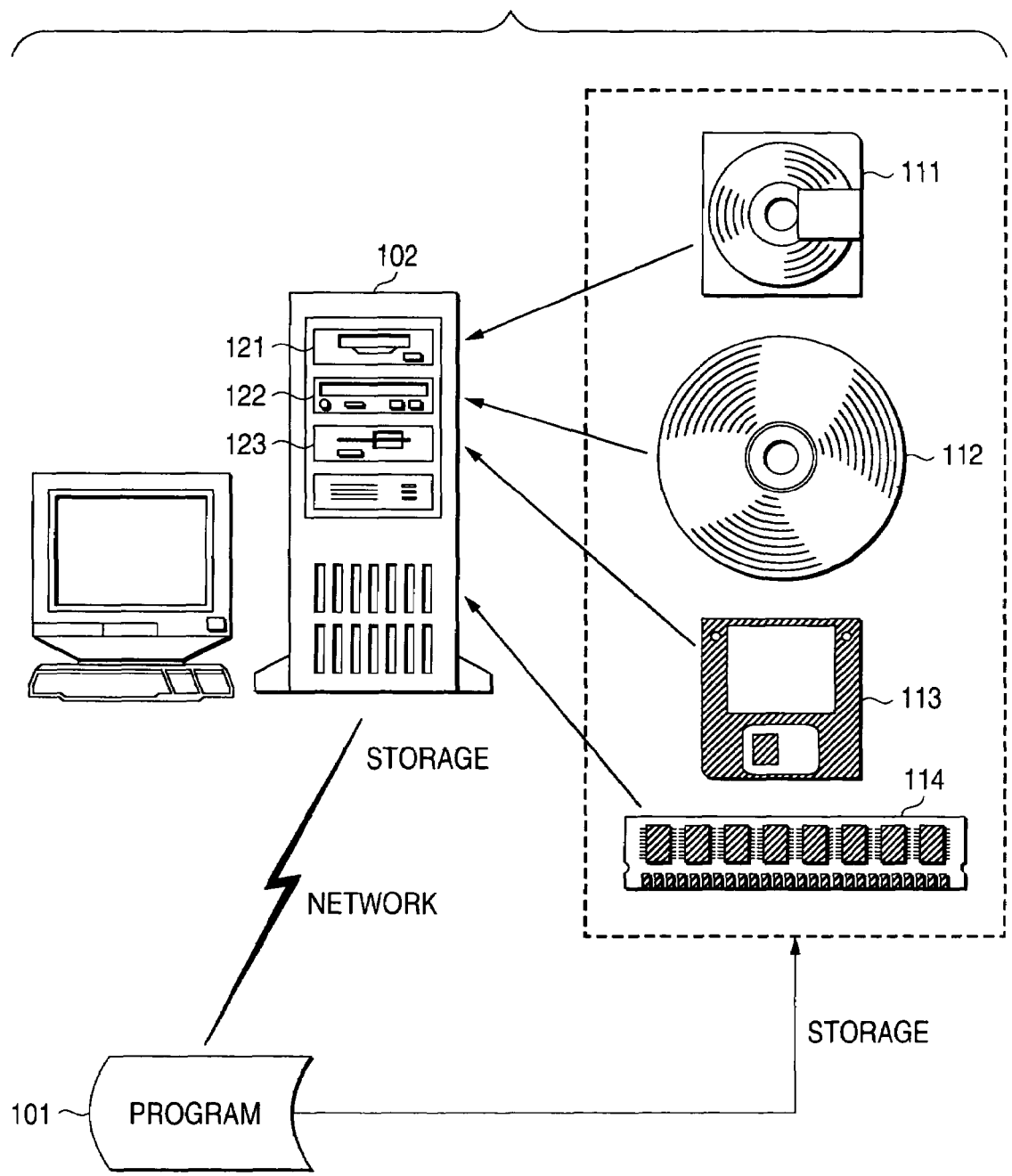
FIG. 13 is a view for explaining an example of a computer program and a storage medium storing the computer program in the case where the function of the color processing apparatus or the color processing method according to the invention is realized by the computer program.

FIG. 13 is a view showing an example of a computer program and a storage medium storing the computer program in the case where the function of the color processing apparatus or the color processing method according to the invention is realized by the computer program. In FIG. 13, the reference numeral 101 designates a program; 102, a computer; 111, an opto-magnetic disk; 112, an optical disk; 113, a magnetic disk; 114, a memory; 121, an opto-magnetic disk device; 122, an optical disk device; and 123, a magnetic disk device.

The function described in each of the embodiments of the invention can be also realized by the program 101 that can be executed by the computer. In this case, the program 101 and data used by the program can be stored in a tangible storage medium that can be read by the computer. Examples of the storage medium are the opto-magnetic disk 111, the optical disk 112 (inclusive of a CD, a DVD, etc.), the magnetic disk 113, and the memory 114 (inclusive of an IC card, a memory card, etc.). It is a matter of course that these storage media are not limited to portable media.

After the program 101 is stored in any one of these storage media in advance, the storage medium may be mounted into, for example, the opto-magnetic disk device 121, the optical disk device 122, the magnetic disk device 123 or a memory slot not shown in the computer 102. In this case, the program 101 can be read from the storage medium so that the function of the color processing apparatus or the color processing method according to the invention can be executed by the computer. Or after a storage medium is mounted in the computer 102 in advance, the program 101 may be transferred to the computer 102, for example, through a network so that the program 101 is stored in the storage medium. Also in this case, the program 101 can be executed by the computer 102. Incidentally, part of the function of the invention may be constructed by hardware or all the function of the invention may be constructed by hardware.

As is obvious from the above description, in accordance with the embodiments of the invention, for adjustment of the color of a specific region such as a memory color, a reproduction color adjustment distance is calculated on the basis of the representative color of the specific region and the target color to thereby set a reproduction color. When color adjustment is made on the basis of the reproduction color, the color can be prevented from being adjusted to a color widely different from the color of the original image. Accordingly, there is an effect that color adjustment can be made to obtain an image which is not unnatural compared with the original image and which can bring out desirableness sufficiently.

What is claimed is:

1. A computer-implemented color processing method for adjusting colors of a specific region, which is a subject of the adjustment in a color image, the color processing method comprising:
   calculating a color adjustment distance, which is an Euclidean distance in a color space between a representative color defined in the color space representing the specific region in the color image and a target color, which is target of the adjustment and also defined in the color space, using a computer on the basis of the representative color and the target color; and
   deciding, using the computer, a reproduction color in the color space expressing the representative color of the specific region after the adjustment on the basis of the color adjustment distance, the reproduction color being located in the color space between the representative color and the target color, and the reproduction color having a reproduction distance, which is a distance between the representative color and the reproduction color, wherein
   the reproduction distance increases with increase in the color adjustment distance when the color adjustment distance is smaller than a certain value and decreases with increase in the color adjustment distance when the color adjustment distance is larger than the certain value.

2. The color processing method according to claim 1, wherein the reproduction color is calculated on the basis of the color adjustment distance and the reproduction distance.

3. The color processing method according to claim 2, further comprising:
   calculating a brightness adjustment coefficient, which is used to adjust brightness of the reproduction color, on the basis of the representative color, wherein:
   in the calculation of the reproduction color, the reproduction color is calculated on the basis of the color adjustment distance, the reproduction distance coefficient, and the brightness adjustment coefficient.

4. The color processing method according to claim 3, wherein the brightness adjustment coefficient is calculated on the basis of at least one of brightness, color saturation and hue of the representative color.

5. The color processing method according to claim 2, wherein the reproduction distance is expressed by one of a monotone decreasing function of the color adjustment distance and a differentiable and continuous function of the color adjustment distance.

6. The color processing method according to claim 2, wherein the reproduction distance coefficient is constant when the color adjustment distance is not larger than the certain value but the reproduction distance coefficient is expressed by a differentiable and continuous function of the color adjustment distance when the color adjustment distance is larger than the certain value.

7. The color processing method according to claim 1, wherein the target color is one of a given color, a color selected from a plurality of colors, and a color having a predetermined color component ratio.

8. The color processing method according to claim 1, wherein the target color is a color having the same color component ratio as that of the representative color.

9. The color processing method according to claim 1, further comprising:
   adjusting colors of the specific region toward the reproduction color.

10. A color processing apparatus for adjusting colors of a specific region, which is a subject of the adjustment in a color image, the color processing apparatus comprising:
    a color adjustment distance calculation section of a computer that calculates a color adjustment distance, which is an Euclidean distance in a color space between a representative color defined in the color space representing the specific region in the color image and a target color, which is target of the adjustment and also defined in the color space, on the basis of the representative color and the target color; and
    a reproduction color decision section of a computer that decides a reproduction color expressing the representative color of the specific region after the adjustment on the basis of the color adjustment distance, wherein the reproduction color is located in the color space between the representative color and the target color, and the reproduction color having a reproduction distance, which is a distance between the representative color and the reproduction color, wherein
    the reproduction distance increases with increase in the color adjustment distance when the color adjustment distance is smaller than a certain value and decreases with increase in the color adjustment distance when the color adjustment distance is larger than the certain value.

11. The color processing apparatus according to claim 10, wherein the target color is one of a given color, a color selected from a plurality of colors, and a color having a predetermined color component ratio.

12. The color processing apparatus according to claim 10, wherein the target color is a color having the same color component ratio as that of the representative color.

13. The color processing apparatus according to claim 10, further comprising:
    a color adjustment unit that adjusts the colors of the specific region toward the reproduction color.

14. A color processing apparatus for adjusting colors of a specific region, which is a subject of the adjustment in a color image, the color processing apparatus comprising:
    a color adjustment distance calculation unit of a computer that calculates a color adjustment distance, which is an Euclidean distance in a color space between a representative color in the color space representing the specific region in the color image and a target color, which is a target of the adjustment and also defined in the color space, on the basis of the representative color and the target color;
    a reproduction distance coefficient calculation unit of a computer that calculates a reproduction distance coefficient, which is used to calculate a reproduction color in the color space expressing the representative color of the specific region after color adjustment, on the basis of the color adjustment distance, the reproduction distance coefficient being a distance between the representative color and the reproduction color; and
    a reproduction color calculation unit of a computer that calculates the reproduction color on the basis of the color adjustment distance and the reproduction distance coefficient, wherein the reproduction distance coefficient increases with increase in the color adjustment distance when the color adjustment distance is smaller than a certain distance and decreases with increase in the color adjustment distance when the color adjustment distance is larger than the certain value.

15. The color processing apparatus according to claim 14, further comprising:
a brightness adjustment coefficient calculation unit that calculates a brightness adjustment coefficient, which is used to adjust the brightness of the reproduction color, on the basis of the representative color, wherein:
the reproduction color calculation unit calculates the reproduction color on the basis of the color adjustment distance, the reproduction distance coefficient, and the brightness adjustment coefficient.

16. color processing apparatus according to claim 15, wherein the brightness adjustment coefficient calculation unit calculates the brightness adjustment coefficient on the basis of at least one of brightness, color saturation and hue of the representative color.

17. The color processing apparatus according to claim 14, wherein the reproduction distance coefficient calculation unit calculates the reproduction distance coefficient in accordance with one of a monotone decreasing function of the color adjustment distance and a differentiable and continuous function of the color adjustment distance.

18. The color processing apparatus according to claim 14, wherein the reproduction distance coefficient calculation unit calculates the reproduction distance coefficient in accordance with a function of the color adjustment distance which takes a constant when the color adjustment distance is not larger than the certain value, but is a differentiable and continuous function when the color adjustment distance is larger than the certain value.

19. A storage medium for storing a program readable by a computer, the program making the computer execute a color process for adjusting colors of a specific region, which is a subject of color adjustment in a color image, wherein the program making the computer execute a color processing comprising:
calculating a color adjustment distance, which is an Euclidean distance in a color space between a representative color in the color space representing the specific region in the color image and a target color, which is target of the adjustment and also defined in the color space, on the basis of the representative color and the target color; and
deciding a reproduction color in the color space expressing the representative color of the specific region after the adjustment on the basis of the color adjustment distance, the reproduction color being located in the color space between the representative color and the target color, and the reproduction color having a reproduction distance, which is a distance between the representative color and the reproduction color, wherein
the reproduction distance increases with an increase in the color adjustment distance when the color adjustment distance is smaller than a certain value and decreases with increase in the color adjustment distance when the color adjustment distance is larger than the certain value.

20. A printer comprising:
a color processing device, including a computer, for adjusting colors of a specific region, which is a subject of the adjustment in a color image, wherein the color processing device includes:
a color adjustment distance calculation section that calculates a color adjustment distance, which is an Euclidean distance in a color space between a representative color in the color space representing the specific region in the color image and a target color, which is a target of the adjustment and also defined in the color space, on the basis of the representative color and the target color; and
a reproduction color decision section that decides a reproduction color in the color space expressing the representative color of the specific region after the adjustment on the basis of the color adjustment distance, wherein the reproduction color is located in the color space between the representative color and the target color, and the reproduction color having a reproduction distance, which is a distance between the representative color and the reproduction color,
wherein the reproduction distance increases with increase in the color adjustment distance when the color adjustment distance is smaller than a certain value and decreases with increase in the color adjustment distance when the color adjustment distance is larger than the certain value.

* * * * *